US012807435B2

(12) United States Patent
Courtens

(10) Patent No.: US 12,807,435 B2
(45) Date of Patent: Nov. 24, 2026

(54) CONTAINER HANDLING SYSTEM FOR A TRANSPORTATION VEHICLE

(71) Applicant: VOLVO TRUCK CORPORATION, Gothenburg (SE)

(72) Inventor: Fabrice Courtens, Caluire et Cuire (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 731 days.

(21) Appl. No.: 18/343,522

(22) Filed: Jun. 28, 2023

(65) Prior Publication Data

US 2024/0010450 A1 Jan. 11, 2024

(30) Foreign Application Priority Data

Jul. 5, 2022 (EP) .................................... 22183145

(51) Int. Cl.
*B65G 67/08* (2006.01)

(52) U.S. Cl.
CPC ...... *B65G 67/08* (2013.01); *B65G 2201/0235* (2013.01)

(58) Field of Classification Search
CPC ............................... B60P 1/025; B60P 1/6481
USPC ............ 24/494–497, 485, 489, 499; 414/351
See application file for complete search history.

(56) References Cited

U.S. PATENT DOCUMENTS 3,863,753 A * 2/1975 Shank, Jr. ............... B65B 35/16 294/90
3,894,630 A * 7/1975 Shank, Jr. ............... B65B 21/12 198/470.1
6,062,620 A * 5/2000 Walker ...................... B66C 1/10 294/67.5
8,109,550 B1 * 2/2012 Benjamin ................ B66D 3/18 294/67.31
11,560,079 B2 * 1/2023 Lundeen ................... B60P 1/38
(Continued)

FOREIGN PATENT DOCUMENTS

CN 110395582 A 11/2019
EP 3228496 A2 10/2017
(Continued)

OTHER PUBLICATIONS

Extended European Search Report in corresponding European Application No. 22183145.6 dated Dec. 21, 2022 (18 pages).

*Primary Examiner* — Mark C Hageman
(74) *Attorney, Agent, or Firm* — Jeffri A. Kaminski; Venable LLP

(57) ABSTRACT

A container handling system includes a conveyer belt arranged in a closed loop, and a container holding arrangement comprising a first structure connected to, and movable along, the conveyer belt around the closed loop, and a second structure to attach the container holding arrangement to a container. The second structure has a hook cover attached to the first structure, and a pair of brackets to mechanically connect the second structure to the container. Each of the pair of brackets is pivotably movable relative to the hook cover between a released state in which a first portion of the bracket is arranged at a distance from an abutment surface of the hook cover, and a locked state in which the first portion, when subject to a force causing the pivotable movement of the bracket, abuts with the abutment surface of the hook cover.

15 Claims, 6 Drawing Sheets

(56) References Cited

U.S. PATENT DOCUMENTS

| | | | | |
|---|---|---|---|---|
| 11,787,323 | B2 * | 10/2023 | Meador | B60P 1/36 414/528 |
| 11,978,012 | B2 * | 5/2024 | Gil | B65G 1/133 |
| 11,981,508 | B2 * | 5/2024 | Chen | B60P 1/6436 |
| 12,026,663 | B1 * | 7/2024 | Kalm | B65G 1/137 |
| 12,172,564 | B2 * | 12/2024 | Hopkins | G06Q 10/08 |
| 12,473,149 | B1 * | 11/2025 | Brady | B60P 3/007 |
| 12,570,198 | B2 * | 3/2026 | Farquhar | B60P 1/6481 |
| 2017/0291766 | A1 * | 10/2017 | Orth | G06Q 10/0832 |
| 2017/0349079 | A1 * | 12/2017 | Wilkinson | B65G 1/06 |
| 2019/0229003 | A1 | 7/2019 | Kesil | |
| 2020/0074404 | A1 * | 3/2020 | Gil, Jr | B64U 50/39 |
| 2022/0129833 | A1 | 4/2022 | Gil | |

FOREIGN PATENT DOCUMENTS

| | | | |
|---|---|---|---|
| EP | 3228496 | A3 | 10/2017 |
| FR | 3083535 | A1 | 1/2020 |
| JP | 6031405 | A | 2/1985 |
| JP | 4110242 | A | 4/1992 |
| WO | 2022128947 | A1 | 6/2022 |

* cited by examiner

CONTAINER HANDLING SYSTEM FOR A TRANSPORTATION VEHICLE

TECHNICAL FIELD

The present invention relates to a container handling system for a transportation vehicle. The present invention also relates to a vehicle comprising such a container handling system.

BACKGROUND

Within the field of distribution vehicles, such as transportation vehicles, the goods to be transported from one position to another are conventionally stored on the floor in a compartment rearward of the cabin or on the floor of a compartment on e.g. a trailer of the vehicle. The goods are carried into the truck or driven in by a pallet truck, where the pallet truck gains access to the compartment by opening a rear door. The use of a pallet truck requires that the vehicle is loaded or unloaded with goods at a logistic hub where the floor of the truck compartment is flush with the floor of the logistic hub. If the floor of the truck compartment is not flush with the floor of the logistic hub, a time-consuming lifting and lowering of the rear opening is required to load/unload the goods using the pallet truck.

Also, delivery of goods often requires re-loading of the goods if the goods intended for delivery is not positioned closest to the rear door of the compartment. Another conventional but rather expensive solution is to use a crane having a crane lift arm lifting the goods into and out from the transportation vehicle.

There is thus a desire to streamline the process of loading and unloading of goods for a transportation vehicle.

SUMMARY

It is thus an object of the present invention to at least partially overcome the above-described deficiencies.

According to a first aspect, there is provided a container handling system for a transportation vehicle, the container handling system comprising a conveyer belt arranged in a closed loop, and a container holding arrangement comprising a first structure connected to, and movable along, the conveyer belt around the closed loop, and a second structure configured to attach the container holding arrangement to a container, wherein the second structure comprises a hook cover attached to the first structure, and a pair of brackets configured to mechanically connect the second structure to the container, each of the pair of brackets being pivotably movable relative to the hook cover between a released state in which a first portion of the bracket is arranged at a distance from an abutment surface of the hook cover, and a locked state in which the first portion, when subject to a force causing the pivotable movement of the bracket, is arranged in abutment with the abutment surface of the hook cover.

The wording "closed loop" should be construed such that the container holding arrangement can move a full lap and more around the conveyer belt. Thus, the container holding arrangement can be moved as many laps as desired along the conveyer belt.

The present invention on the insight that by providing a container holding arrangement suspended and movable along a closed loop conveyer belt, the operator can efficiently arrange the container next up for loading or unloading at a loading/unloading position of the transportation vehicle. Hereby, there is no need for re-loading of containers when loading/unloading, which instead can be done by moving the containers along the conveyer belt until the container intended for loading/unloading is positioned at the position of the vehicle intended for loading/unloading, such as e.g. at the rear end.

Furthermore, the hook cover will enable for a simple attachment of the container holding arrangement to the container which will further streamline the process of loading and unloading the containers. Also, the force causing the pivotable movement of the bracket is preferably obtained by the interaction between the brackets and the container, whereby the hook cover is arranged in a self-locking state to the container which will provide safe handling of the containers when e.g. raising and lowering the containers relative to the conveyer belt.

According to an example embodiment, each bracket may be spring loaded to assume the released state when the first portion is un-subject to the force causing the pivotable movement of the bracket. Hereby, an operator can easily detach the hook cover from the container when e.g. unloading a container since the spring force will assist the operator to move the bracket to the released state.

According to an example embodiment, the hook cover may comprise a pair of pivot joints, each bracket being pivotably connected to a respective one of the pivot joints.

According to an example embodiment, each bracket may comprise a second portion, the second portion comprising a protruding member configured to attach to the container when the bracket assumes the locked state.

An advantage is, as also indicated above, that the protruding portion will be self-locked to the container since the force acting on the first portion will prevent the brackets from being released.

According to an example embodiment, the second structure may be movably connected to the first structure.

Hence, the second structure can be raised and lowered relative to the first portion, i.e. raised, and lowered relative to the conveyer belt. As will be described further below, the transportation vehicle may comprise a tiltable rear end and the movable second portion hereby enables for loading/unloading of containers without the use of a pallet truck or crank lift.

According to an example embodiment, the container handling system may further comprise a cable connecting the first and second structures to each other.

According to an example embodiment, the first structure may comprise a motor, wherein the cable is attached to the motor, the motor being configured to move the second structure vertically relative to the first structure. The cable and motor are thus preferably arranged as a winch.

According to an example embodiment, the first structure may comprise at least two wheels connecting the first structure to the conveyer belt. Hereby, the first structure is rolling on the conveyer belt.

According to an example embodiment, the container handling system may further comprise the container, the container having an upper end facing the hook cover and a pair of side surfaces extending vertically from the upper end towards a lower end, wherein each of the side surfaces comprises an indentation, the indentation being attached to the bracket when the bracket assumes the locked state.

According to a second aspect, there is provided a vehicle comprising a container handling system according to any one of the embodiments described above in relation to the first aspects.

According to an example embodiment, the vehicle may comprise a tiltable rear end, wherein the container is vertically movable through an opening formed by the tiltable rear end. An advantage of the tiltable rear end is that the use of e.g. a pallet truck or crane lift for loading and unloading is more or less obsolete. The containers can hereby be loaded to the transportation vehicle or unloaded from the transportation vehicle without having to dock the transportation vehicle at a logistic hub where the floor of the truck compartment is flush with the floor of the logistic hub. Hence, the tiltable rear end will enable for loading and unloading at street level which opens up for an increased number of available loading/unloading positions available for the transportation vehicle.

According to an example embodiment, the vehicle may comprise a control unit comprising processing circuitry coupled to the first structure, the processing circuitry being configured to receive a signal indicative of an unloading destination of the container, and control the first structure to be arranged vertically above the tiltable rear end when the vehicle arrives at the unloading destination.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the processing circuitry may be configured to control the first structure to be arranged vertically above the tiltable rear end prior to the vehicle arrives at the unloading destination. The processing circuitry can hereby, in advance, prepare the container next up for unloading to be arranged at the rear end when the vehicle arrives at the unloading destination. This will further improve the efficiency at the unloading destination. Preferably, and according to an example embodiment, the vehicle may further comprise a human machine interface (HMI), wherein the signal indicative of the unloading destination is received from the HMI.

According to an example embodiment, the vehicle may comprise a plurality of container holding arrangements, each container holding arrangement being connected to a respective container, wherein the processing circuitry is configured to receive a signal indicative of a container of the plurality of containers being empty, determine which second structure being connected to the empty container, and control the first structure attached to the second structure connected to an empty container to be arranged vertically above the tiltable rear end when the vehicle arrives at a loading position. The efficiency of loading the vehicle is hereby also substantially improved.

Further effects and features of the second aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
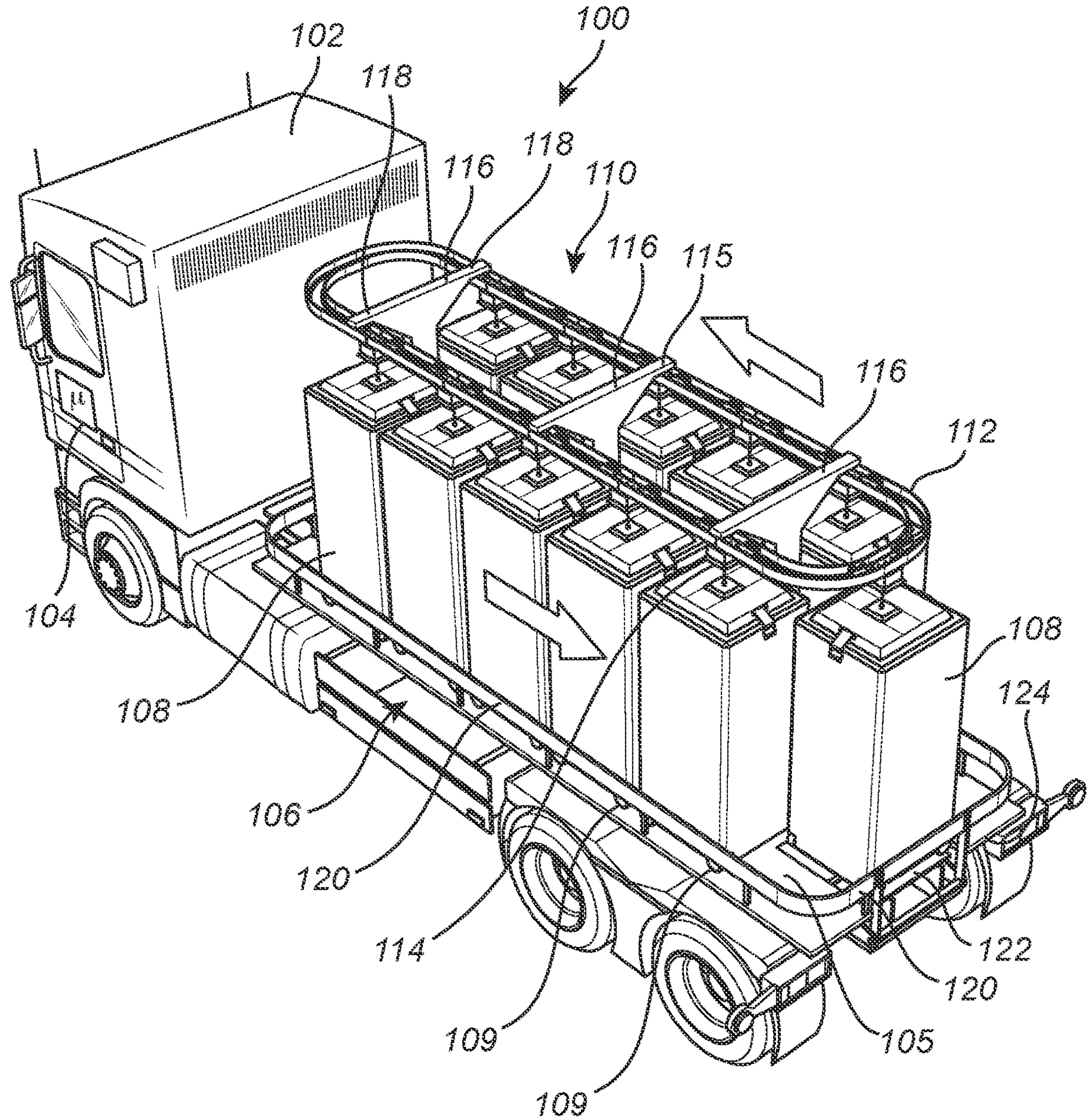
FIG. 1 is a perspective view illustrating a transportation vehicle provided with a container handling system.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

The terminology used herein is for the purpose of describing particular embodiments only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

With particular reference to FIG. 1, there is depicted a transportation vehicle 100 in the form of a truck. The transportation vehicle 100, also merely referred to as the vehicle 100, comprises a cabin 102 in which an operator of the vehicle can control the vehicle 100. A control unit 104 is also provided in the vehicle 100, and schematically illustrated as forming part of the cabin 102, although the control unit 104 can be arranged on other parts of the vehicle 100 as well.

The vehicle 100 also comprises a platform body 106 arranged behind the cabin 102 as seen in a forward driving direction of the vehicle 100. The platform body 106 is configured for transportation of goods and products from a starting position to an end destination. The goods and products are transported in containers 108 arranged on a truck bed 105 of the platform body 106. Thus, the containers 108 provided with the goods and products are lifted onto the platform body 106 during loading at the starting position, and lifted off from the platform body 106 during unloading at the end destination. The platform body 106 is exemplified as an open platform body 106 without side walls and a roof. It should however be readily understood that the present invention which will be described in further detail below is equally applicable for closed platform bodies, i.e. a platform body provided with side walls and a roof.

The vehicle 100 further comprises a container handling system 110 for handling the containers 108 arranged on the truck bed 105 of the platform body 106. As can be seen in FIG. 1, the container handling system 110 comprises a conveyer belt 112. The conveyer belt 112 is arranged in a closed loop configuration, exemplified as arranged in an oval shape. Each of the containers 108 is connected to the conveyer belt 112 via a container holding arrangement 114 which will be described in further detail below with reference to the description of FIGS. 3 and 4. The containers 108 are thus movable along the conveyer belt 112 and can in practice move as many laps as desired. As exemplified in FIG. 1, the containers 108 are provided with wheels 109 such that each container 108 rolls on the truck bed 105 when moved along the extension of the conveyer belt 112.

The conveyer belt 112 is supported by a beam arrangement 115. The beam arrangement 115 is exemplified as comprising three vertically standing beams 116 positioned at a predetermined distance from each other along the longitudinal extension of the platform body 106. The vertically standing beams 116 are supported on the truck bed 105 of the platform body 106 and each has a vertical extension that extends to a position above a vertically upper portion of the conveyer belt. The vertically upper end of each vertically standing beams 116 comprises a pair of arm portions 118, wherein the conveyer belt is connected to the arm portions 118 and is thus more or less hanging in the beam arrangement 115.

During operation of the vehicle 100, processing circuitry of the control 104 is configured to receive a signal indicative of an unloading destination of a container 108 arranged on the platform body 106. The processing circuitry thereafter controls the container holding arrangement 114 connected to the specific container 108 such that the container is arranged vertically above the tiltable rear end when the vehicle arrives at the unloading destination. The container holding arrangement 114 may thus be provided with a motor (not shown) in communication with the control unit 104, which motor operates the container holding arrangement 114 to arrive at the position above the tiltable rear end. The control unit 104 may advantageously receive the signal relating to the unloading destination of the container 108 from an operator via a human machine interface, HMI (not shown).

As indicated in FIG. 1, the vehicle comprises a plurality of container holding arrangements each connected to a respective container. The processing circuitry is here also configured to receive a signal indicative of a container of the plurality of containers being empty. The processing circuitry may here control the container holding arrangement provided with an empty container to arrange the empty container vertically above the tiltable rear end when, or prior to, the vehicle arrives at a loading position.

The vehicle 100 also comprises a lower guiding rail 120. The lower guiding rail 120 is extending around the truck bed 105 of the platform body 106 and prevents the containers 108 from swinging laterally out from the platform body 106 when driving the vehicle 100. Furthermore, the vehicle also comprises a tiltable rear end 122 arranged at a rear end 124 of the platform body 106 as seen in the longitudinal driving direction of the vehicle 100. As will be evident from the below description, the tiltable rear end 122 enables for simple and efficient loading and unloading of the containers onto and off from the platform body 106. In order to describe the tiltable rear end 122 in further detail, reference is now made to FIGS. 2*a*-2*c*.

Figure 2A:
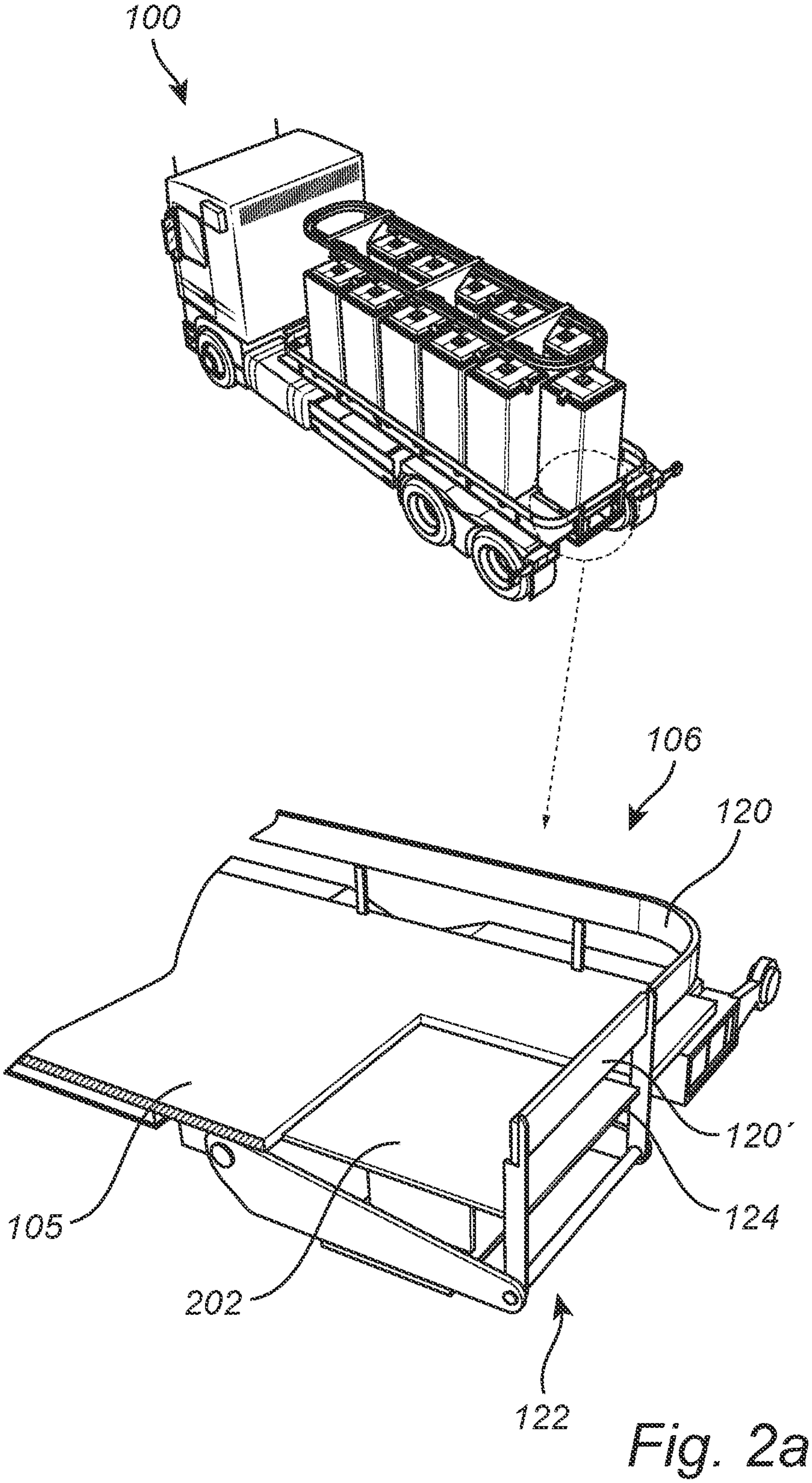
FIGS. 2*a*-2*c* are a detailed illustrations of a tiltable rear end of the floor of the transportation vehicle in FIG. 1 according to an example embodiment.

As detailed in FIG. 2*a*, the tiltable rear end 122 is arranged at the rear end 124 of the platform body 106 and illustrated as arranged in a closed position. The tiltable rear end 122 comprises a floor portion 202 which can be opened to form an opening (see FIG. 2*b*) in the truck bed 105. The tiltable rear end 122 also comprises a lower guiding rail portion 120'. The lower guide rail portion 120' is, together with the above-described lower guide rail 120, forming a closed loop guiding rail when the tiltable rear end 122 is closed. Hence, the lower guide rail portion 120' aligns with the lower guide rail 120 when the tiltable rear end 122 is closed. As can be seen in FIG. 2*a*, the floor portion 202 and the truck bed 105 are also more or less flush with each other when the tiltable rear end 122 is closed, i.e. when the opening is closed.

Figure 2B:
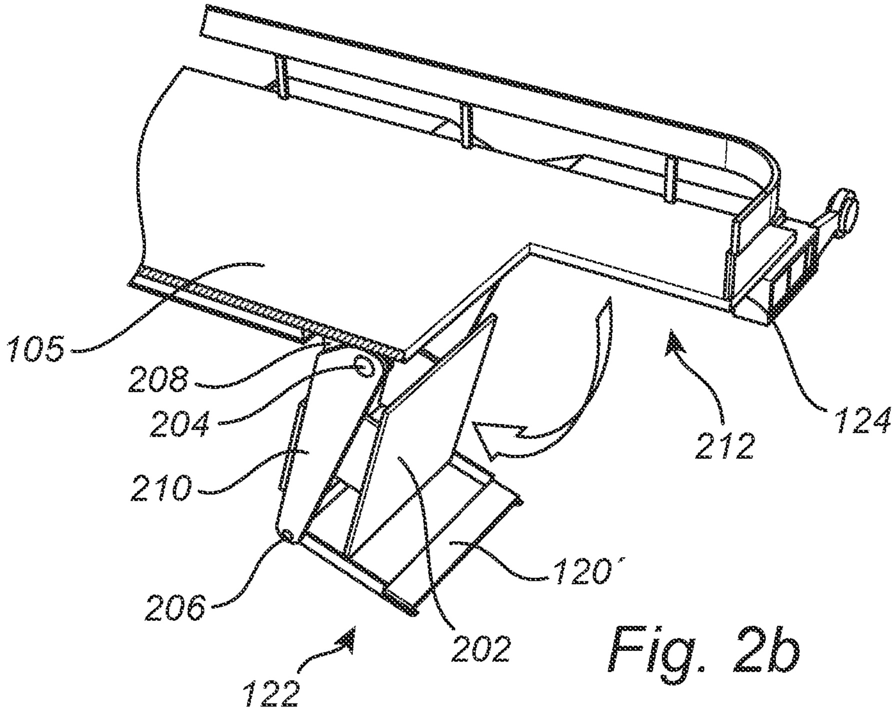
Figure 2C:
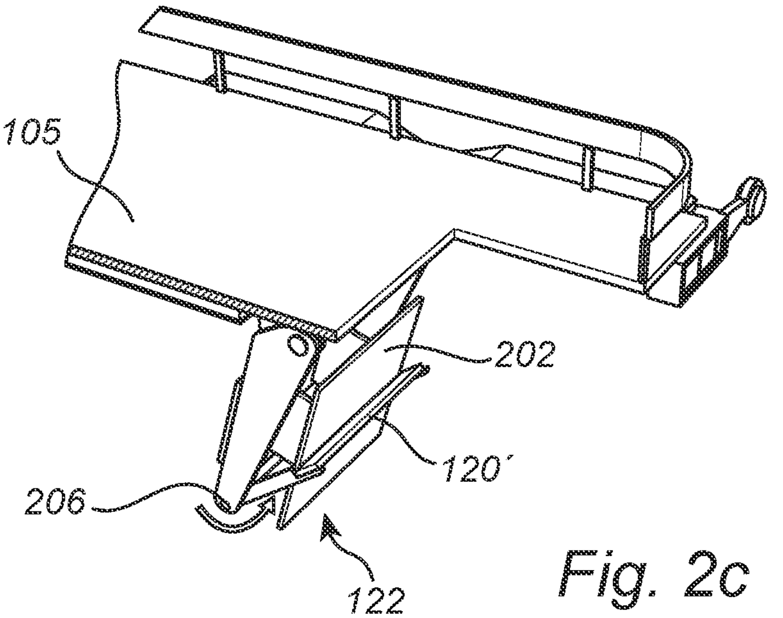

Turning to FIGS. 2*b*-2*c*, which illustrate the tiltable rear end 122 when being arranged in an open position. As can be seen, the tiltable rear end 122 comprises a first pivot joint 204. The first pivot joint 204 comprises a first geometric axis (not shown) extending in a transverse direction of the vehicle 100. The first pivot joint 204 is pivotably connecting a first bracket 208 to a second bracket 210. The first bracket 208 is attached to the truck bed 105 of the platform body 106. When moving the tiltable rear end 122 from the closed position indicated in FIG. 2*a* to the open position in FIG. 2*b*, the second bracket 210 is rotated around the first pivot joint towards such that the floor portion 202 is rotated downwards away from the truck bed 105, whereby the opening 212 at the rear end 124 is formed.

As can be seen in FIG. 2*c*, the tiltable rear end 122 also comprises a second pivot joint 206. The second pivot joint 206 comprises a second geometric axis (not shown) extending in a transverse direction of the vehicle 100. The second pivot joint 206 is pivotably connecting the second bracket 210 to the lower guide rail portion 120' as well as to the floor portion 202. After the tiltable rear end 122 is arranged in the open position indicated in FIG. 2*b*, the lower guide rail portion 120' can be rotated around the second pivot joint 206 to thereby move the lower guide rail portion 120' further away from the ground at which the vehicle 100 is standing. Put it differently, the lower guide rail portion 120' is rotated to be moved towards the truck bed 105 of the platform body 106. Hereby, the tiltable rear end 122 is less bulky and the lower guide rail portion 120' will not intervene with the container 108 when loading/unloading to/from the platform body 106. Although FIGS. 2 and 3 have indicated the second bracket 210 is pivoted around the first pivot joint 204 before the lower guide rail portion 120' is pivoted around the second pivot joint 206, it should be readily understood that the procedure of arranging the tiltable rear end 122 in the open position may be performed in the opposite order. In such case, the lower guide rail portion 120' is firstly pivoted around the second pivot joint 206, whereafter the second bracket 210 is pivoted around the first pivot joint 204.

Figure 3:
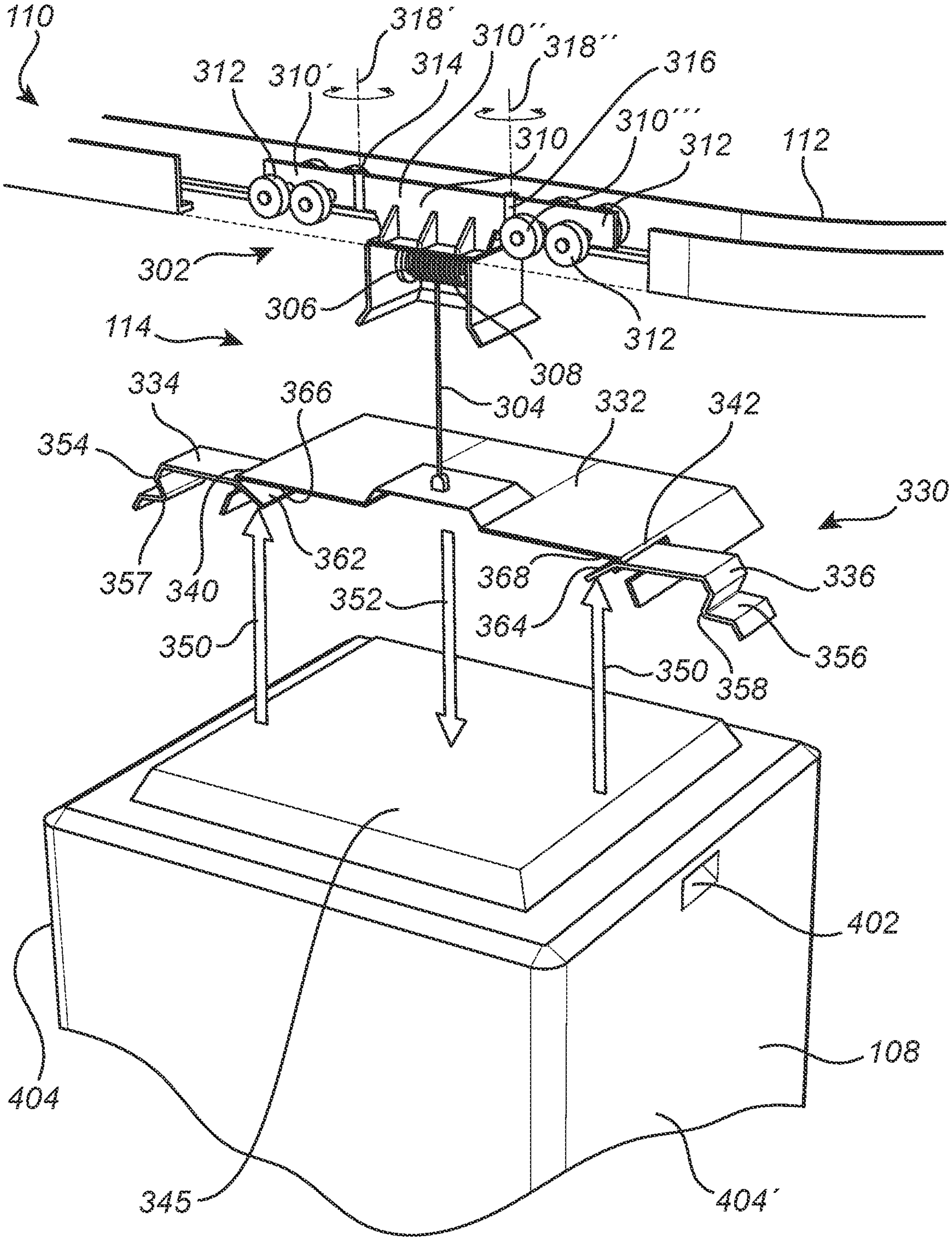
FIG. 3 is a perspective view of the interaction between a container holding arrangement and a container before the container holding arrangement is connected to the container.
Figure 4:
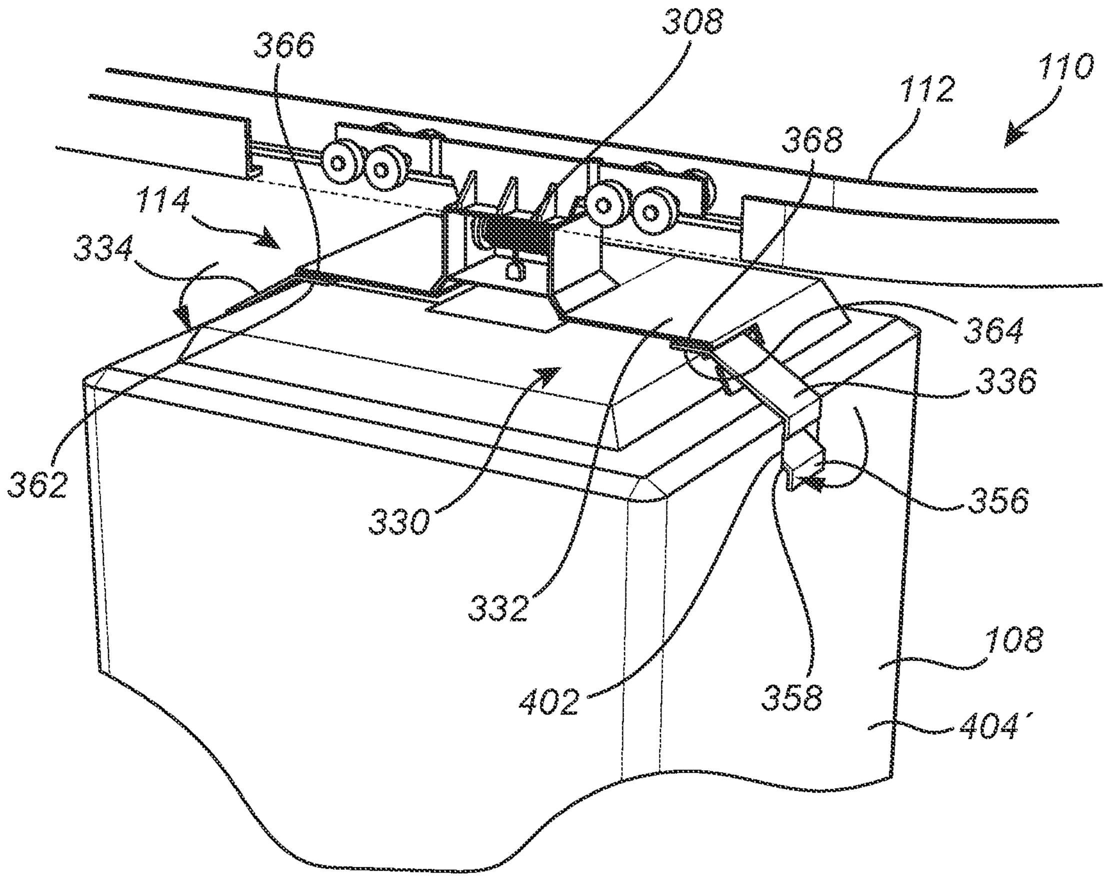
FIG. 4 is a perspective view of the interaction between the container holding arrangement and the container when the container holding arrangement is connected to the container.

In order to describe the above-described container holding arrangement 114 in further detail, reference is now made to FIGS. 3 and 4 which are partly cut-out views of the container handling system 110. FIG. 3 illustrates the container holding arrangement 114 before attachment to the container 108, while FIG. 4 illustrates the container holding arrangement 114 attached to the container 108.

Starting with FIG. 3, the container holding arrangement 114 comprises a first structure 302 connected to, and movable along, the conveyer belt 112. In detail, the exemplified first structure 302 comprises a sliding rail 310 provided with wheels 312 such that the sliding rail 310 is rolling onto the conveyer belt 112. As further exemplified in FIG. 3, the sliding rail 310 comprises a first 310', a second 310" and a third 310'" rail portion, where the first rail portion 310' is pivotably connected to the second rail portion 310" via a first rail pivot joint 314, and the third rail portion 310—is pivotably connected to the second rail portion 310" via a second rail pivot joint 316. Hereby, the first 310' and third 310'" rails portions are pivotable relative to the second rail portion 310" around a respective geometric axis 318', 318". The pivotable connections simplifies for the sliding rail 310 to pass around the curved parts of the conveyer belt.

The first structure 302 further comprising a rotating cylinder 306 and a motor 308 configured to rotate the rotating cylinder 306 relative to the sliding rail 310. The rotating cylinder 306 is thus rotatably connected to the sliding rail 310 and rotatable around a geometric axis (not shown) substantially perpendicular to the extensions of the geometric axis 318', 318" of the first 314 and second 316 rail pivot joints.

The container holding arrangement 114 further comprises a second structure 330 connectable to the container 108. The second structure 330 comprises a hook cover 332 connected to the first structure 302. In FIG. 3, the hook cover 332 is exemplified as connected to the first structure 302 via a cable 304. It should be understood that the cable may be replaced by e.g. a chain, or other elongated members. The cable 304 is attached to the hook cover 332 as well as to the rotating cylinder 306. Hereby, the motor 308, when rotating the cylinder 306 will be able to move the hook cover 332 towards and away from the conveyer belt 112.

Furthermore, the second structure 330, which is arranged in a non-attached state relative to the container 108, comprises a pair of brackets 334, 336. Each of the pair brackets 334, 336 is configured to mechanically connect the second structure 330 to the container 108. In particular, each bracket 334, 336 is pivotably connected to the hook cover 332 at a respective pivot joint 340, 342, also in the following referred to as hook cover pivot joints 340, 342. Each of the hook cover pivot joints 340, 342 is thus arranged between the hook cover 332 and the respective brackets. Each bracket 334, 336 is thus rotatably movable relative to the hook cover 332 between a released state as depicted in FIG. 3, and a locked state depicted in FIG. 4 and described further below. The exemplified configuration depicted in FIG. 3 is thus applicable when the second structure 330 and the container 108 are moved relative to each other as indicated by arrows 350, 352.

The brackets 334, 336 are arranged in the released state indicated in FIG. 3 by a spring (not shown) arranged in each of the hook cover pivot joints 340, 342. Thus, each bracket 334, 336 is spring loaded to assume the released state when the second structure is arranged at a vertical distance from an upper end 345 of the container 108.

Moreover, each bracket 334, 336 comprises a first portion 362, 364. The first portion comprises a surface which faces a downward facing surface of the hook cover 332. The downward facing surface of the hook cover 332 comprises a pair of abutment surfaces 366, 368, each arranged at a respective one of the hook cover pivot joints 340, 342. When the brackets 334, 336 assumes the released state indicated in FIG. 3, the first portion 362, 364 of each bracket is arranged at a distance from the abutment surface 366, 368. The spring-loaded brackets 334, 336 thus assume the released state when the first portion 362, 364 is not exposed to a force in the vertical direction. Each of the brackets 334, 336 also comprises a second portion 354, 356. The second portion 354, 356 is arranged at an opposite side of the hook cover pivot joints 340, 342 compared to the first portion 362, 364. The second portion 354, 356 comprises a protruding portion 357, 358. The protruding portions 357, 358 are, as will be evident from the below description of FIG. 4, facing the container 108 when the brackets are connected to the container 108. When the brackets 334, 336 assume the released state, the second portions 354, 356 are arranged at a further distance from each other compared to when the brackets 334, 336 assumes the locked state.

Turning now to FIG. 4, which illustrates when the second structure 330 is attached to the container 108, and the container 108 has been lifted by the motor 308 to an upper position in the vicinity of the conveyer belt 112. The motor 308 has thus, prior to the illustration in FIG. 4, moved the second portion 330 downwards to engage with the upper end 345 of the container 108. In particular, when the second portion 330 engages with the container 108, each of the first portions 362, 364 is subject to a vertical force from the upper end 345 of the container 108. Put it differently, the first portions 362, 364 can be subject to a force by the dead weight of the hook cover 332 when in contact with the upper end 345 of the container.

The vertical force will cause the brackets to rotate around the respective hook cover pivot joints 340, 342 forcing the first portion 362, 364 in abutment with the abutment surface 366, 368. By means of the pivotally arranged brackets, the second portions 354, 356 of each bracket is hereby moved towards each other, whereby the protruding portions 357, 358 of the brackets are attached to an indentation 402 arranged on a respective vertically extending side surface 404, 404' of the container 108. The brackets 334, 336 hereby assume the locked state. When pulling the second structure upwards towards the conveyer belt, a self-locking effect is achieved by the pivotably connected brackets 334, 336, whereby the containers 108 will be securely attached when subsequently operating the vehicle 100.

Figure 5:
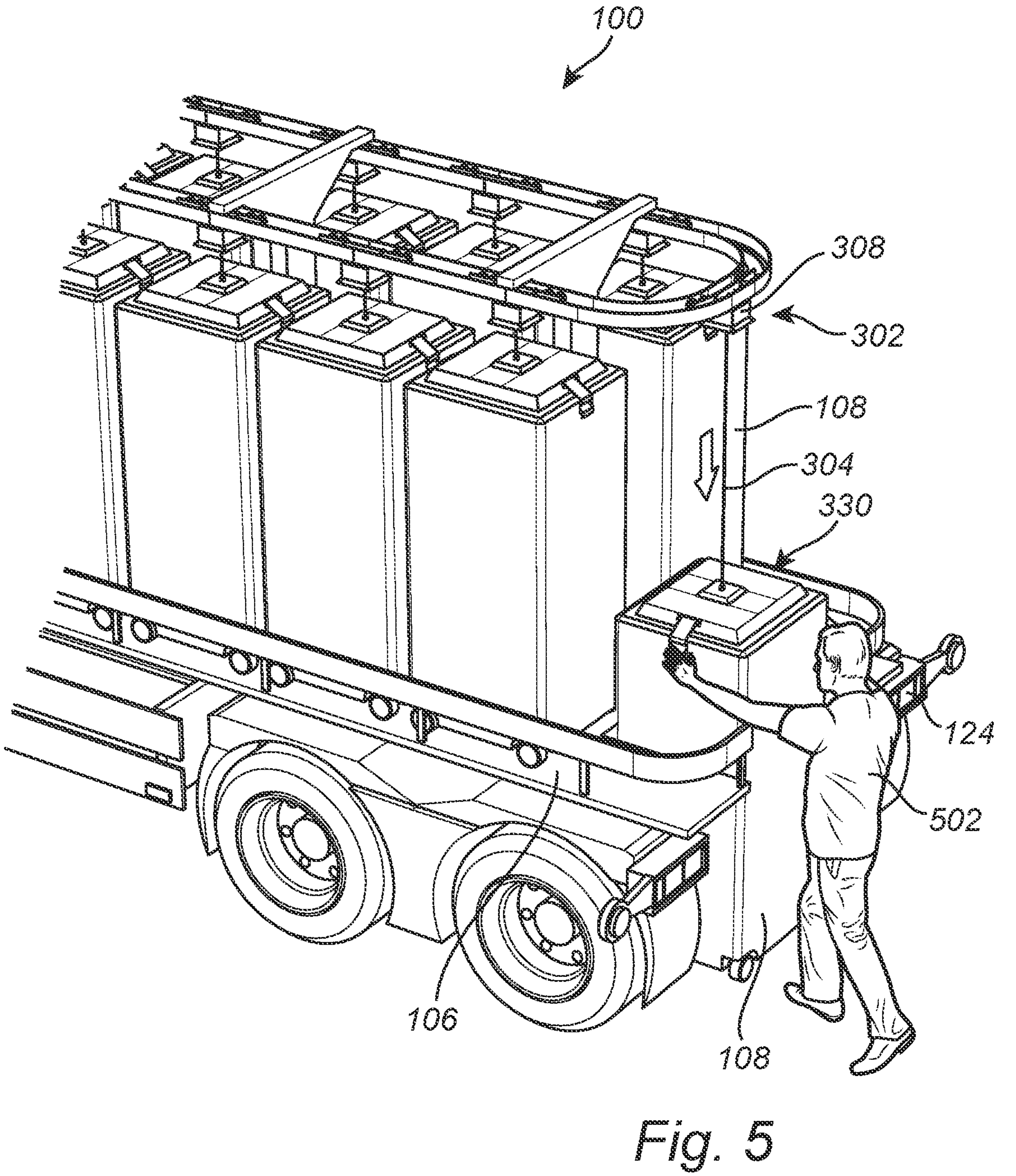
FIG. 5 is a perspective view illustrating a loading/unloading action of a container to the container handling system.

Reference is now made to FIG. 5 which is a schematic illustration of an operator managing the container handling system and the containers arranged on the platform body 106. In particular, the operator 502 is standing behind the rear end 124 of the vehicle 100 and the tiltable rear end 122 is open as illustrated in FIG. 2*c*. The container 108 is attached to the second structure as described above in relation to FIG. 4. The second structure 330 is moved vertically downward from the first structure 302 by the motor 308 for the operator to release the container 108 for delivery. The brackets are released from the container 108 with the assistance from the operator 502 forcing the brackets to assume the released state.

It is to be understood that the present disclosure is not limited to the embodiments described above and illustrated in the drawings; rather, the skilled person will recognize that many changes and modifications may be made within the scope of the appended claims.

The invention claimed is:

1. A container handling system for a transportation vehicle, the container handling system comprising:

a conveyer belt arranged in a closed loop, and a container holding arrangement comprising a first structure connected to, and movable along, the conveyer belt around the closed loop, and a second structure configured to attach the container holding arrangement to a container, the first structure comprising a motor configured to move the second structure vertically relative to the first structure, wherein the second structure comprises a hook cover attached to the first structure, and a pair of brackets configured to mechanically connect the second structure to the container, each of the pair of brackets being pivotably movable relative to the hook cover between a released state in which a first portion of the bracket is arranged at a distance from an abutment surface of the hook cover, and a locked state in which the first portion, when subject to a force causing the pivotable movement of the bracket, is arranged in abutment with the abutment surface of the hook cover.

2. The container handling system according to claim 1, wherein each bracket is spring loaded to assume the released state when the first portion is un-subject to the force causing the pivotable movement of the bracket.

3. The container handling system according to claim 1, wherein the hook cover comprises a pair of pivot joints, each bracket being pivotably connected to a respective one of the pivot joints.

4. The container handling system according to claim 1, wherein each bracket comprises a second portion, the second portion comprising a protruding member configured to attach to the container when the bracket assumes the locked state.

5. The container handling system according to claim 1, wherein the second structure is movably connected to the first structure.

6. The container handling system according to claim 5, wherein the container handling system further comprises a cable connecting the first and second structures to each other.

7. The container handling system according to claim 6, wherein the cable is attached to the motor.

8. The container handling system according to claim 1, wherein the first structure comprises at least two wheels connecting the first structure to the conveyer belt.

9. The container handling system according to claim 1, further comprising the container, the container having an upper end facing the hook cover and a pair of side surfaces extending vertically from the upper end towards a lower end, wherein each of the side surfaces comprises an indentation, the indentation being attached to the bracket when the bracket assumes the locked state.

10. A vehicle comprising a container handling system according to claim 1.

11. The vehicle according to claim 10, wherein the vehicle comprises a tiltable rear end, wherein the container is vertically movable through an opening formed by the tiltable rear end.

12. The vehicle according to claim 11, further comprising a control unit comprising processing circuitry coupled to the first structure, the processing circuitry being configured to:

receive a signal indicative of an unloading destination of the container, and control the first structure to be arranged vertically above the tiltable rear end when the vehicle arrives at the unloading destination.

13. The vehicle according to claim 12, further comprising a human machine interface, wherein the signal indicative of the unloading destination is received from the HMI.

14. The vehicle according to claim 12, wherein the processing circuitry is configured to control the first structure to be arranged vertically above the tiltable rear end prior to the vehicle arrives at the unloading destination.

15. The vehicle according to claim 12, wherein the vehicle comprises a plurality of container holding arrangements, each container holding arrangement being connected to a respective container, wherein the processing circuitry is configured to:

receive a signal indicative of a container of the plurality of containers being empty, determine which second structure being connected to the empty container, and control the first structure attached to the second structure connected to an empty container to be arranged vertically above the tiltable rear end when the vehicle arrives at a loading position.

* * * * *